US009866575B2

(12) United States Patent
Schwartz et al.

(10) Patent No.: US 9,866,575 B2
(45) Date of Patent: Jan. 9, 2018

(54) MANAGEMENT AND DISTRIBUTION OF VIRTUAL CYBER SENSORS

(71) Applicant: General Electric Company, Schenectady, NY (US)

(72) Inventors: Matthew Richard Schwartz, Mechanicville, NY (US); Daniel Thanos, Markham (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 186 days.

(21) Appl. No.: 14/873,506

(22) Filed: Oct. 2, 2015

(65) Prior Publication Data

US 2017/0099305 A1 Apr. 6, 2017

(51) Int. Cl.
*H04L 29/06* (2006.01)

(52) U.S. Cl.
CPC .......... *H04L 63/1416* (2013.01); *H04L 29/06* (2013.01); *H04L 63/1425* (2013.01); *H04L 63/1491* (2013.01)

(58) Field of Classification Search
CPC ............. H04L 63/1416; H04L 63/1491; H04L 63/1425
See application file for complete search history.

(56) References Cited

U.S. PATENT DOCUMENTS

| 8,429,746 | B2 | 4/2013 | Capalik | |
| 8,516,596 | B2* | 8/2013 | Sandoval | G06F 21/554 726/25 |
| 8,561,187 | B1* | 10/2013 | Hegli | H04L 63/1491 726/22 |
| 8,990,842 | B2* | 3/2015 | Rowley | A63F 99/005 382/118 |
| 9,483,742 | B1* | 11/2016 | Ahmed | G06N 99/005 |
| 9,485,276 | B2* | 11/2016 | Quinlan | H04L 63/1491 |
| 2006/0101516 | A1 | 5/2006 | Sudaharan et al. | |
| 2007/0150955 | A1* | 6/2007 | Murase | H04L 63/1416 726/23 |

(Continued)

FOREIGN PATENT DOCUMENTS

| WO | 2005/112390 A1 | 11/2005 |
| WO | 2012/164336 A1 | 12/2012 |
| WO | 2013/113532 A1 | 8/2013 |

OTHER PUBLICATIONS

Harrison, J. Symantec Corp., "Honeypots: The sweet spot in the network security", Computerworld, pp. 1-4, Nov. 20, 2003.*

(Continued)

*Primary Examiner* — Kambiz Zand
*Assistant Examiner* — Tongoc Tran
(74) *Attorney, Agent, or Firm* — GE Global Patent Operation

(57) ABSTRACT

A system includes reception of data at a computing network, generation of alerts at the computing network based on received data and on cyber sensor data, the cyber sensor data defining data attribute, reception of alerts from the computing network at a defense engine, detection of events based on the received alerts at the defense engine, generation threat data based on the detected events, generation of first cyber sensor data based on the threat data, and initiation of deployment of the first cyber sensor data within the computing network.

18 Claims, 6 Drawing Sheets

(56) References Cited

U.S. PATENT DOCUMENTS

| | | | | |
|---|---|---|---|---|
| 2008/0010225 | A1* | 1/2008 | Gonsalves | G06N 7/005 706/11 |
| 2010/0083378 | A1* | 4/2010 | Cheswick | G06F 21/554 726/23 |
| 2010/0319069 | A1 | 12/2010 | Granstedt et al. | |
| 2011/0208849 | A1 | 8/2011 | Barnett et al. | |
| 2011/0264608 | A1 | 10/2011 | Gonsalves et al. | |
| 2012/0233098 | A1* | 9/2012 | Schwoegler | G06N 7/005 706/12 |
| 2013/0152199 | A1 | 6/2013 | Capalik | |
| 2013/0174256 | A1 | 7/2013 | Powers | |
| 2013/0312092 | A1 | 11/2013 | Parker | |
| 2015/0066739 | A1* | 3/2015 | Lucas, Jr. | G06Q 40/025 705/38 |
| 2015/0127789 | A1* | 5/2015 | Lissack | H04L 41/5022 709/221 |
| 2015/0326588 | A1* | 11/2015 | Vissamsetty | H04L 63/1491 726/23 |
| 2015/0332054 | A1* | 11/2015 | Eck | H04L 63/1433 726/25 |
| 2015/0381649 | A1* | 12/2015 | Schultz | H04L 63/1433 726/25 |
| 2016/0205123 | A1* | 7/2016 | Almurayh | H04L 63/1425 726/23 |
| 2016/0285914 | A1* | 9/2016 | Singh | H04L 63/20 |

OTHER PUBLICATIONS

Kreibich, Christian et al., "Honeycomb—Creating Intrusion Detection Signatures Using Honeypots", CCR Paper Comment, Discussion, and Update Forum, ACM SIGCOMM Computer Communication Reviews, Jan. 2014, vol. 34, No. 1, Internet:URL http:www.acm.org/sigcomm/CCR/forum, (pp. 51-56, 6 total pages).

Hogue, Tom et al., "Cisco Secure Data Center for Enterprise Solution: First Look Design Guide", Nov. 2013, 54pgs.

* cited by examiner

MANAGEMENT AND DISTRIBUTION OF VIRTUAL CYBER SENSORS

BACKGROUND

Computer networks are ubiquitous, particularly in enterprise and industrial contexts. For example, industrial control systems monitor and control the operation of machinery, such as wind turbines, gas turbines, compressors, motors, generators, and other devices. Interconnection of these and other computer networks facilitates sharing of information therebetween, but increases the threat of cyber attacks.

Honeynets, Honeypots and honeyports have been employed to address this threat. These systems are used to create fake, or dummy, services which appear legitimate to attackers. Honeynets, Honeyports and/or honeypots may cause an attacker to make additional pivots in a system, stay connected longer, and be more likely to identify themselves or their motives. Honeyports employ server socket listeners which expose fake services in order to entice port scanners to connect thereto, and report when a connection has been established. A honeypot may comprise a partial or full system (e.g., decoy servers or systems) which gathers information regarding the tactics and/or identity of a network intruder. The threat information received by a honey system (e.g. honeyports/pots/nets) facilitates the detection of, investigation of and response to attacks.

However, deployment of honeyports/pots/nets in production environments is typically not feasible due to the high level of overhead required to maintain them. Additionally, an attacker could potentially use the honeyports/pots/nets to gain access to the target network.

DESCRIPTION

Some embodiments relate to systems to facilitate network reconnaissance, attacker isolation and acquisition of threat intelligence. By analyzing data provided by cyber sensors and by a network's installed security information and event management (SIEM) solution, some embodiments leverage a continuous, automatic, and/or operator-assisted feedback mechanism. This may provide a dynamically-changing environment for collecting attribution data and behavior analysis data, and for addressing detected threats.

Figure 1:
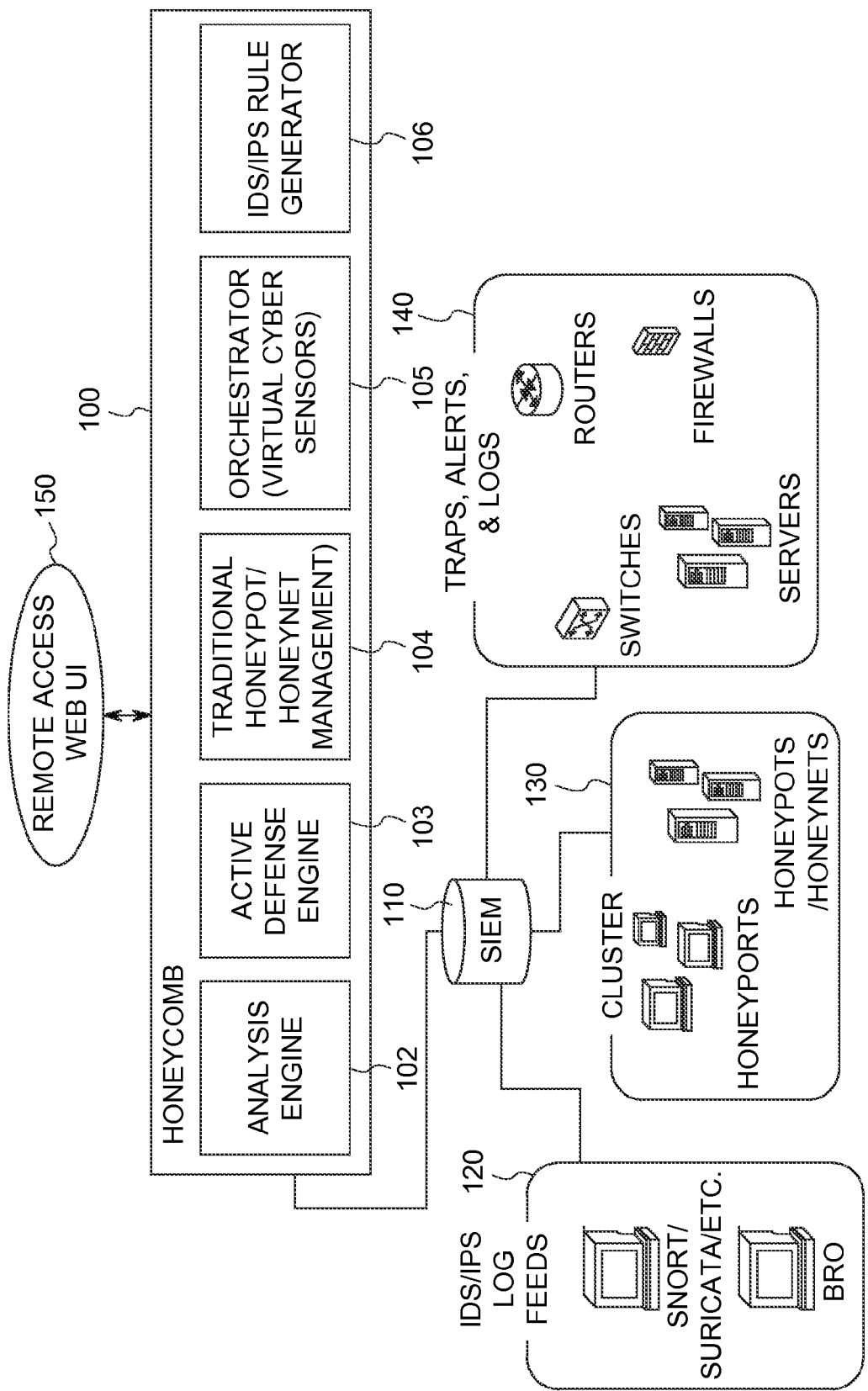
FIG. 1 is a block diagram of a system architecture according to some embodiments.

FIG. 1 represents a logical architecture according to some embodiments. Other implementations may include more or different components arranged in other manners.

Honeycomb 100 includes analysis engine 102, active defense engine 103, honeypot/honeynet 104, orchestrator 105 and Intrusion Detection System (IDS)/IPS Intrusion Prevention System (IPS) rule generator 106. Analysis engine 102 may provide offline deep analysis of detected malware/ and/or other threats. Active defense engine 103 provides honeyports (to be described in detail below), false targets with call backs with DLP strings, and analytics/trigger points. These analytics/trigger points may enable full packet capture and file capture (i.e., tied to false targets and analysis engine 102) according to some embodiments.

Honeypots/honeynets 104 are known in the art and described in the present Background. Orchestrator 105 consists of virtual cyber sensors which are tied to a cyber sensor repository, also to be described below. A cyber sensor as described herein may comprise a processing system which detects specified network activity (e.g., events, traffic). Also, the set of activities (i.e., attributes) to be detected by a cyber sensor may also be referred to as a cyber sensor. Orchestrator 105 may build, manage, configure and deploy cyber sensors within honeycomb 100, and may provide a wizard for doing so.

IDS/IPS rule generator 106 builds and tests signatures and rules for threat detection. For example, third-party systems may use these signatures and rules to monitor network traffic and issue an alert if a signature is detected and/or conditions of a rule are met.

Honeycomb 100 communicates with traditional SIEM system 110 which, as is known, receives information from IDS/IPS log feeds 120, honeyport/pot/net cluster 130 and from network components 140, in the form of traps, alerts and logs generated thereby.

Honeycomb 100 also provides UI 150 for accessing information generated by honeycomb 100 and for managing the components therein. As will be described below, UI 150 may provide maps (e.g., satellite, road, or terrain maps, plant maps, logical & physical network maps) indicating locations of all active connections and the logical activities occurring over those connections.

Figure 2:
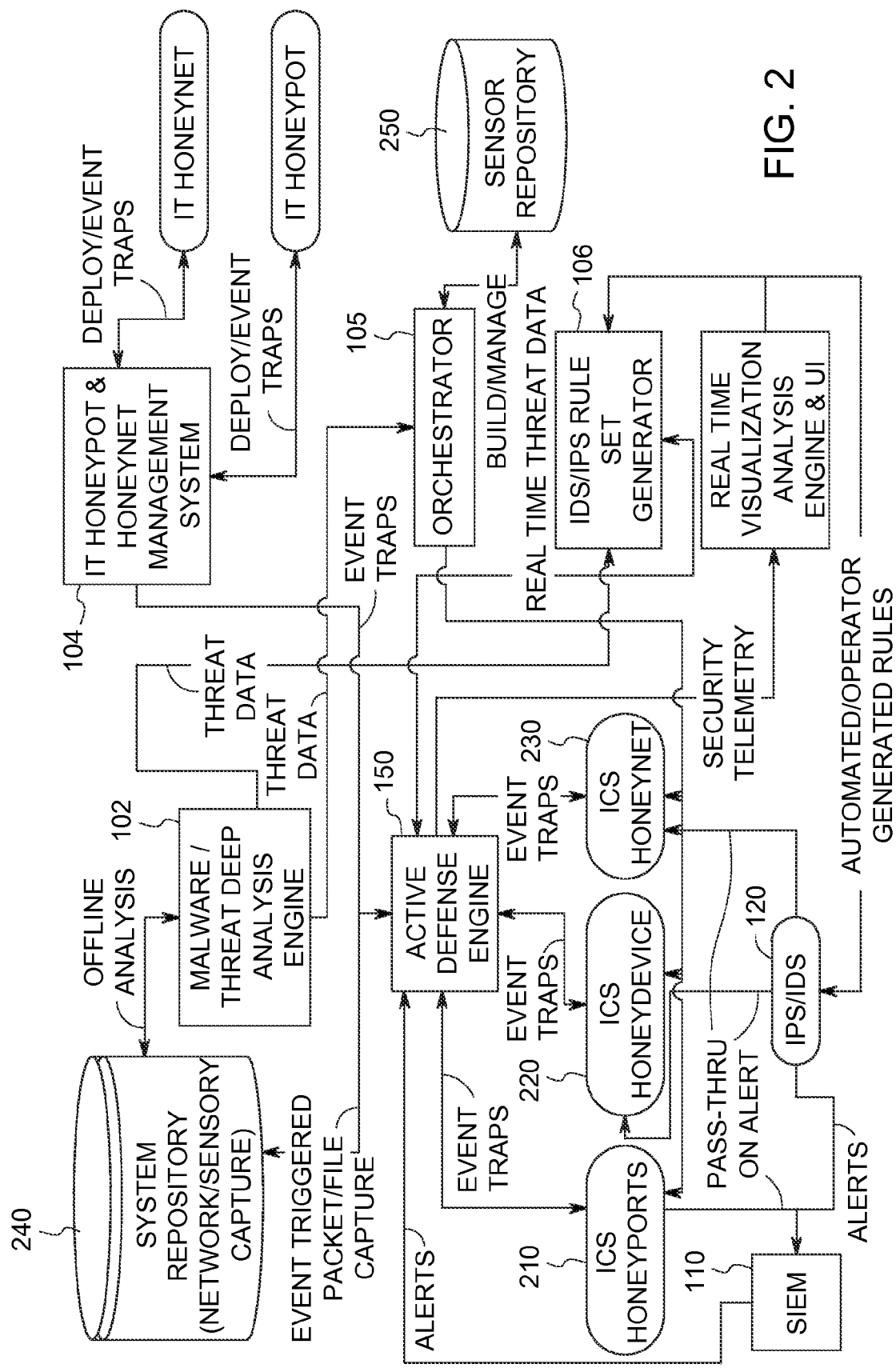
FIG. 2 is an information flow diagram according to some embodiments.

FIG. 2 is a detailed diagram of honeycomb 100 showing operational flow according to some embodiments. Operation of honeycomb 100 may be initiated by an attack vector or reconnaissance activities originating at either Honeyports 210, Honeydevice 220, Honeynet 230 of an industrial control system, or by input derived from SIEM 110. Honeyports 210, Honeydevice 220, Honeynet 230 comprise various combinations of a computer, data, or a network site that appear to be part of a computer network, but are actually isolated and monitored, and which also appear to contain information or a resource of value to attackers. Active defense engine 103 coordinates event detection based on intelligence/alerts received from Honeyports 210, Honeydevice 220, Honeynet 230, and/or from SIEM 110. Generally, active defense engine 103 classifies detected events and determines an appropriate response.

A response may simply consist of issuing an alert and no other response. In other examples, the event is sent to system repository 240. At system repository 240, it may be confirmed that a threat is detected (e.g., based on a policy or rule violation or by utilizing offline malware/threat deep analysis engine 102), and threat data is then passed to the IDS/IPS rule generator 106 for creation of a new or updated rule which may be implemented by IPS/IDS 120 to generate future alerts. The threat data may also be sent to orchestrator 105 for generation of a new or changed honey/port/device/ net cyber sensor based thereon. Orchestrator 105 may build a new cyber sensor, or configure/modify an existing cyber sensor.

In another alternative, honeycomb 100 and, particularly, active defense engine 150, may execute an active response (e.g., an IPS Rule change, a router configuration change (e.g., change an Access Control List), a switch configuration change (e.g., vlan, or port authentication), the instantiation of a virtual clone of the potential target with tainted artifacts (e.g., watermarked documents, DLP tracking callbacks, and false data), etc.

As illustrated, honeycomb 100 provides a continuous feedback loop to monitor attacks, respond to attacks, and to modify itself in order to best monitor future attacks.

Figure 3:
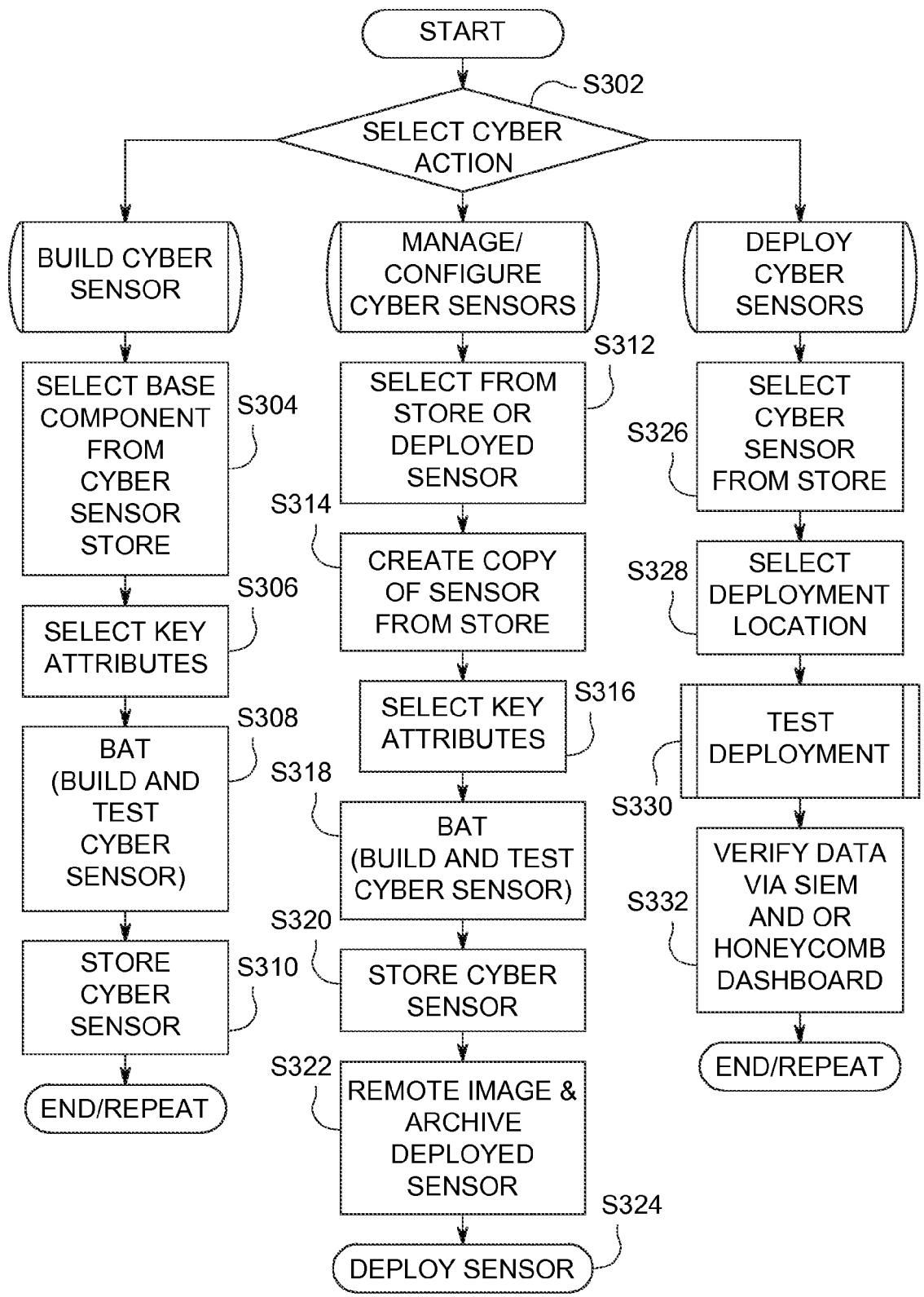
FIG. 3 is a flow diagram according to some embodiments.

FIG. 3 includes a flow diagram of process 300 executed by orchestrator 105 to build, manage and deploy cyber sensors according to some embodiments. In some embodiments, one or more various hardware processing units (e.g., processor(s), processor core(s), execution thread(s)) of honeycomb 100 execute program code to perform process 300. Process 300 and other processes mentioned herein may be embodied in processor-executable program code read from one or more non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 302 may be controlled via UI 150 according to some embodiments. In this regard, honeycomb 100 may provide a Web server allowing a user to interface with and manage the elements of honeycomb 100 over the Web.

Initially, at S302, it is determined whether orchestrator 105 is to build, manage/configure, or deploy a cyber sensor. Assuming orchestrator 105 is to build a cyber sensor, flow proceeds to S304 to select a base component from a cyber sensor store. Such a store may be implemented by sensor repository 250 of FIG. 2.

Next, at S306, key attributes of the cyber sensor are selected. The cyber sensor is built and tested at S308 based on the selected key attributes, and is stored at S310. The cyber sensor may be stored in repository 250.

The selected key attributes may depend upon the type of situation to be sensed. For example, if suspicious Web traffic is to be sensed, the attributes of the cyber sensor may include, but are not limited to, Web Agent Data, plugins, fonts, screen resolution, a Cookies-enabled flag, Supercookies, HTTP ACCEPT headers, current date, time of day and remote user timezone, whether the user is connected via a TOR browser, time spent on page, MAC address vendor codes to learned MAC (ICS is rather deterministic), TTL, WindowSize, TCP Options, IP ID Field, Total Packet Length, and abnormal DNS packets.

Attributes of a cyber sensor may also relate to browsing activity of particular users, for example to determine whether the apparent user is actually performing the browsing activity. These attributes may include indicators of whether or not the user navigates using keyboard shortcuts, of where the user clicks on Web pages (and how often), of how often the user uses auto suggestion, and of how often the user uses spell correction.

With respect to determining whether a particular user is engaged in incoming query activity, cyber sensor attributes may specify: a distribution of short/general queries vs. specific/long tail queries; a frequency of search for data on products owned by the user; a frequency of advanced search command use; a frequency of typographical errors; a typing speed; a time spent on the search result page; a time between selecting different results of a same query; an average amount of search requests per day; an average amount of search requests per topic; a distribution of used search services (e.g., web/images/videos/real time/news/mobile); an average position of selected search results.

In order to manage/configure an existing stored cyber sensor, the cyber sensor is selected from a store or from already-deployed cyber sensors at S312. A copy of the selected sensor is created at S314 and, as described with respect to S306, key attributes of the cyber sensor are selected at S316. The cyber sensor is built and tested at S318 based on the selected key attributes, and is stored at S320. In the case of an already-deployed sensor, the prior version is remotely imaged and archived at S322. The new cyber sensor is deployed at 324, for example within one of Honeyports 210, Honeydevice 220 or Honeynet 230.

Deployment of a cyber sensor may include selection of the cyber sensor from a store at S326, selection of a deployment location at S328, and testing of the deployment at S330. Testing may include introduction of data vectors which should be sensed and flagged by the cyber sensor, as well as vectors which should not be flagged by the cyber sensor.

Testing and deployment of a cyber sensor is dependent upon on the specifics of the cyber sensor. In some instances, the testing may verify that an IPS sensor will fire in response to a particular vector, may confirm that a changed ACL is blocking what is expected to be blocked, and/or may lever routing and VLAN to connect virtual spun up targets. Conventional systems may be used to auto deploy software packages which include technologies like Honeyports.

Data resulting from such testing is verified at S332 via a dashboard and/or STEM 110. Regarding such a dashboard, process 300 may be controlled via UI 150 according to some embodiments. In this regard, honeycomb 100 may provide a Web server and restful API calls allowing a user device to interface with and manage the elements of honeycomb 100 over the Web.

Suitable user devices may include a desktop computer, a laptop computer, a tablet computer, and a smartphone. User devices may execute program code for presenting user interfaces to allow interaction with honeycomb 100 via any one or more communication protocols and communication networks. For example, such communication may conform to HyperText Transport Protocol, File Transfer Protocol, and/or any Software-as-a-Service protocol.

Presentation of a user interface may include any degree or type of rendering, depending on the coding of the user interface. For example, a user device may include a desktop computer executing a Web Browser to receive a Web page or equivalent (e.g., in HTML format) from honeycomb 100 and may render and present the Web page according to known protocols. In one embodiment, the administrative device may present user interfaces by executing a standalone executable file (e.g., an .exe file) or code (e.g., a JAVA applet) within a virtual machine.

Embodiments may provide flexibility via interfacing with other services via associated APIs. These APIs can be used to receive threat information and IPS/IDS rules, and also to push data for external analysis (e.g., a total number of detected viruses.

Figure 4:
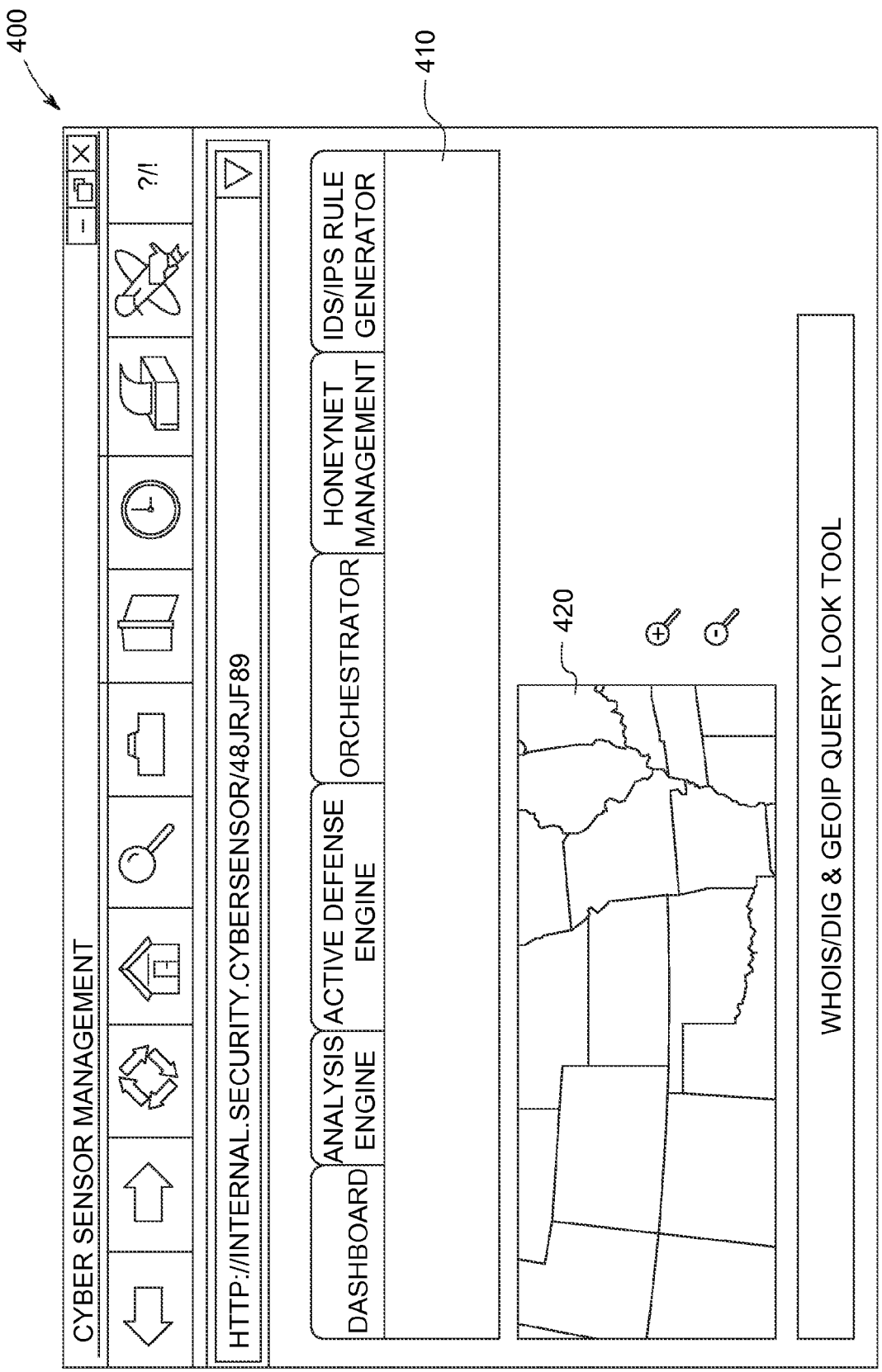
FIG. 4 is an outward view of a user interface according to some embodiments.

FIG. 4 illustrates user interface 400 presented by a user device according to some embodiments. User interface 400 includes interfaces for managing the elements of honeycomb 100, including the building, deployment and management of cyber sensors as described above. For example, area 410 of user interface may present current threats or issues which have been detected, and map 420 may indicate network locations at which such threats and issues are present.

Figure 5:
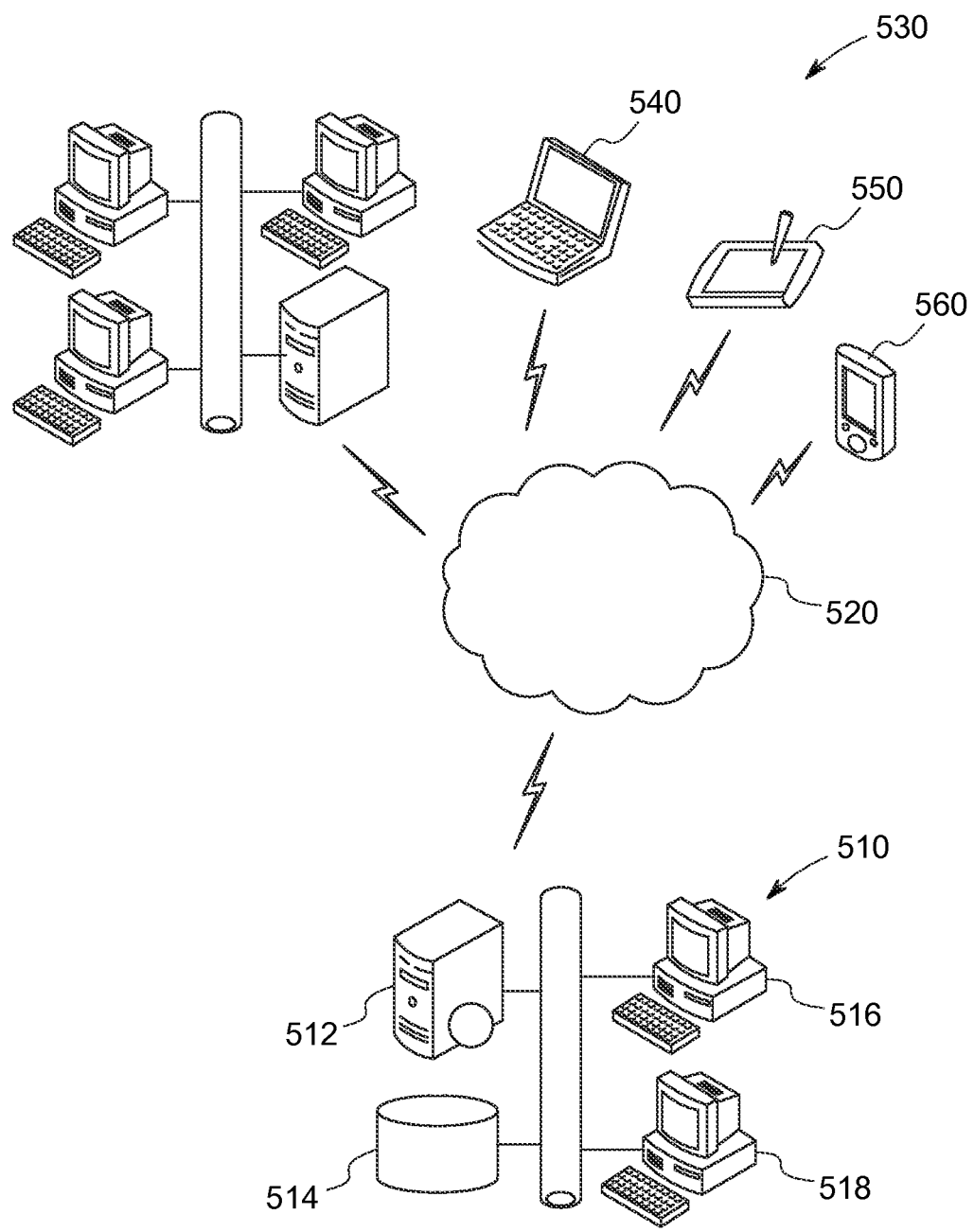
FIG. 5 illustrates a network architecture of a system according to some embodiments.

FIG. 5 illustrates a network architecture according to some embodiments. Network 510 may comprise an industrial control system or any other computing network for which network security is desired. Network 510 may implement honeycomb 100 of FIG. 2. Network 510 includes workstations 516 and 518 and database 514. Web server 512 connects network 510 to Internet 520. Network 510 may comprise any number and type of connected devices, sub-networks and topologies, communicating over any suitable communications media via any suitable protocols.

Administrative network 530 may be used to remotely administer honeycomb 100 of network 510. Such administration may occur via a Web-based UI 150. Other devices 540-560 may also access UI 150 to manage honeycomb 100 of network 510.

Figure 6:
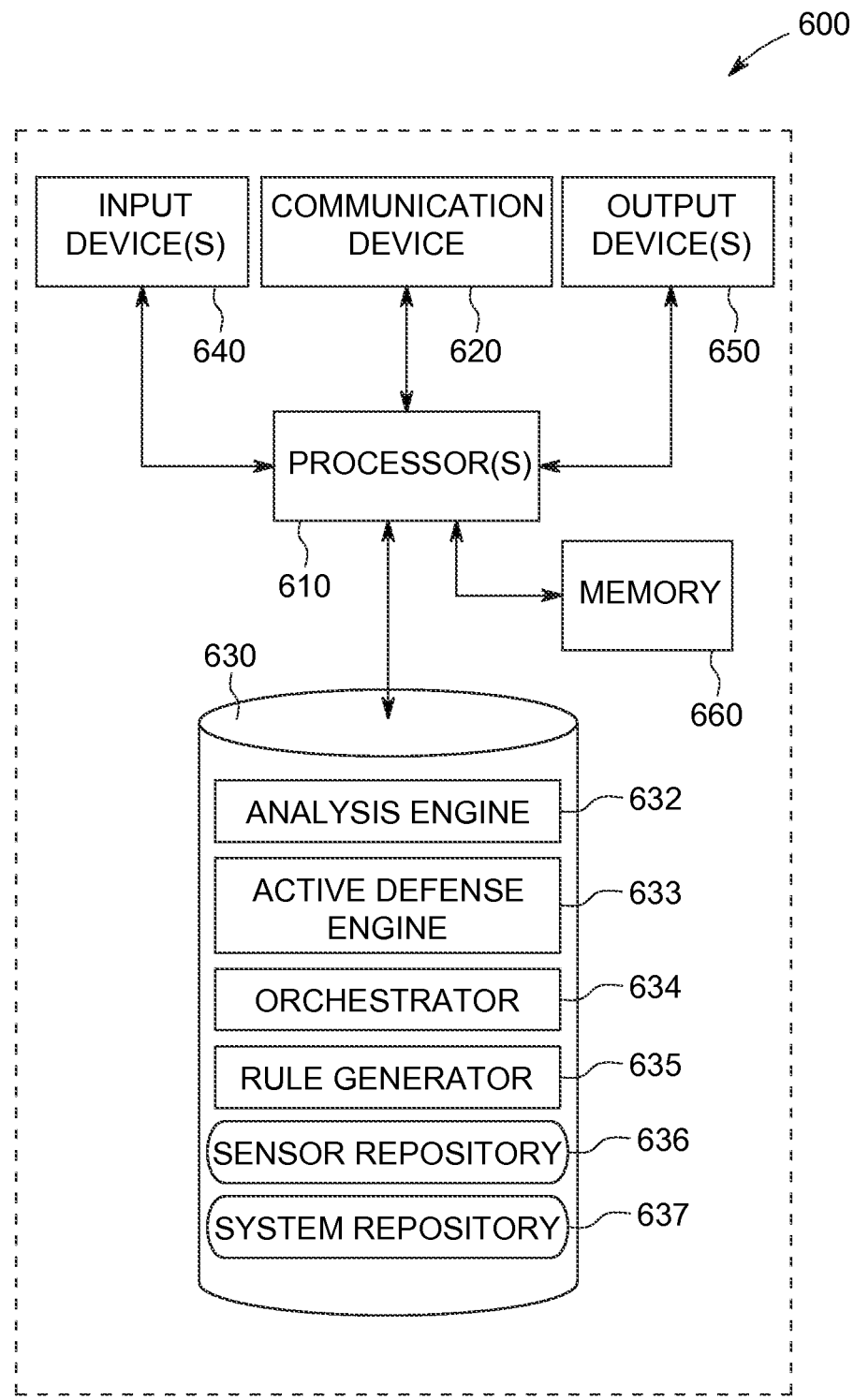
FIG. 6 is a block diagram of a computing apparatus according to some embodiments.

FIG. 6 is a block diagram of system 600 according to some embodiments. System 600 may include a general-purpose computing system and may execute program code to perform any of the processes described herein. System 600 may include an implementation of honeycomb 100 according to some embodiments. System 600 may include other unshown elements according to some embodiments.

System 600 includes one or more processors 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may include, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may include, for example, a display (e.g., a display screen) a speaker, and/or a printer.

Data storage device 630 may include any appropriate persistent storage device, including combinations of magnetic storage devices (e.g., magnetic tape, hard disk drives and flash memory), optical storage devices, Read Only Memory (ROM) devices, etc., while memory 660 may include Random Access Memory (RAM).

Each of analysis engine 632, active defense engine 633, orchestrator 634 and rule generator 635 may include program code executed by processor(s) 610 to cause computing system 600 to perform any one or more of the processes described herein. Embodiments are not limited to execution of these processes by a single apparatus.

Data storage device 630 also stores sensor repository 636 and system repository 637, which may be configured and utilized as described herein. Data storage device 630 may store other data and other program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. A person of ordinary skill in the relevant art may recognize other embodiments may be practiced with modifications and alterations to that described above.

What is claimed is:

1. A system, comprising:
a computing network to generate alerts based on received data and on cyber sensor data, the cyber sensor data defining data attributes;
a defense engine to receive alerts from one or more honeyports, the computing network, and to detect events based on the received alerts;
a system repository to receive information associated with detected events from the computing system;
an analysis engine to generate threat data based on the received information; and
an orchestrator to generate first cyber sensor data based on the threat data, and to initiate deployment of the first cyber sensor data within the computing network wherein generation of the first cyber sensor data comprises (i) receiving a selection of a base cyber sensor component from a sensor repository and (ii) receiving a selection of key attributes associated with the first cyber sensor data.

2. A system according to claim 1, further comprising:
the sensor repository to store the cyber sensor data and the first cyber sensor data,
wherein generation of the first cyber sensor data is based on the base cyber sensor component.

3. A system according to claim 1, wherein the defense engine is further to:
based on the detected events, change a router configuration, change a switch configuration, and/or instantiate a clone of a target including tainted artifacts.

4. A system according to claim 1, further comprising:
a rule set generator to generate intrusion detection system rules based on the threat data; and
an intrusion detection system to generate alerts based on the received data and on the intrusion detection system rules.

5. A system according to claim 4, further comprising:
a security information and event management system to receive the alerts from the intrusion detection system and to transmit alerts to the defense engine.

6. A system according to claim 1, wherein the rule set generator is further to generate intrusion detection system rules based on external threat feeds.

7. A method executable by one or more computing devices in response to execution of processor-executable program code, the method comprising:
receiving data at a computing network from one or more honeyports;
generating alerts at the computing network based on received data and on cyber sensor data, the cyber sensor data defining data attributes;

receiving alerts from the computing network at a defense engine;
detecting events based on the received alerts at the defense engine;
generating threat data based on the detected events;
generating first cyber sensor data based on the threat data wherein generation of the first cyber sensor data comprises (i) receiving a selection of a base cyber sensor component from a sensor repository and (ii) receiving a selection of key attributes associated with the first cyber sensor data; and
initiating deployment of the first cyber sensor data within the computing network.

8. A method according to claim 7, further comprising:
storing the cyber sensor data and the first cyber sensor data in the sensor repository,
wherein generating the first cyber sensor data is based on the base cyber sensor component.

9. A method according to claim 1, further comprising:
based on the detected events, changing a router configuration, changing a switch configuration, and/or instantiating a clone of a target including tainted artifacts.

10. A method according to claim 7, further comprising:
generating intrusion detection system rules based on the threat data; and
generating alerts based on the received data and on the intrusion detection system rules.

11. A method according to claim 10, further comprising:
receiving the alerts from the intrusion detection system at a security information and event management system; and
transmitting the alerts to the defense engine.

12. A method according to claim 10, further comprising:
generating intrusion detection system rules based on external threat feeds.

13. A non-transitory computer-readable medium storing program code, the program code executable by a system to cause the system to:
receive data at a computing network from one or more honeyports;
generate alerts at the computing network based on received data and on cyber sensor data, the cyber sensor data defining data attributes;
receive alerts from the computing network at a defense engine;
detect events based on the received alerts at the defense engine;
generate threat data based on the detected events;
generate first cyber sensor data based on the threat data; and
initiate deployment of the first cyber sensor data within the computing network wherein generation of the first cyber sensor data comprises (i) receiving a selection of a base cyber sensor component from a sensor repository and (ii) receiving a selection of key attributes associated with the first cyber sensor data.

14. A medium according to claim 13, the program code executable by a system to cause the system to:
store the cyber sensor data and the first cyber sensor data in the sensor repository,
wherein generation of the first cyber sensor data is based on the base cyber sensor component.

15. A medium according to claim 13, the program code executable by a system to cause the system to:
based on the detected events, change a router configuration, change a switch configuration, and/or instantiate a clone of a target including tainted artifacts.

16. A medium according to claim 13, the program code executable by a system to cause the system to:
generate intrusion detection system rules based on the threat data; and
generate alerts based on the received data and on the intrusion detection system rules.

17. A medium according to claim 16, the program code executable by a system to cause the system to:
receive the alerts from the intrusion detection system at a security information and event management system; and
transmit the alerts to the defense engine.

18. A medium according to claim 16, the program code executable by a system to cause the system to:
generate intrusion detection system rules based on external threat feeds.

* * * * *